US008625791B2

(12) United States Patent
Massoudi et al.

(10) Patent No.: US 8,625,791 B2
(45) Date of Patent: Jan. 7, 2014

(54) METHODS AND APPARATUSES FOR SELECTIVE DATA ENCRYPTION

(75) Inventors: Ayoub Massoudi, Issy les Moupineaux (AM); Frédéric Lefebvre, Rennes (FR)

(73) Assignee: Thomson Licensing, Issy les Moulineaux (FR)

( * ) Notice: Subject to any disclaimer, the term of this patent is extended or adjusted under 35 U.S.C. 154(b) by 181 days.

(21) Appl. No.: 12/737,260

(22) PCT Filed: Jun. 30, 2009

(86) PCT No.: PCT/EP2009/058161
§ 371 (c)(1),
(2), (4) Date: Dec. 22, 2010

(87) PCT Pub. No.: WO2010/000727
PCT Pub. Date: Jan. 7, 2010

(65) Prior Publication Data
US 2011/0119480 A1    May 19, 2011

(30) Foreign Application Priority Data
Jun. 30, 2008   (EP) .................................... 08305364

(51) Int. Cl.
*H04N 7/167*    (2011.01)
(52) U.S. Cl.
USPC .............................. 380/210; 380/29; 380/201
(58) Field of Classification Search
USPC .......................................... 713/150; 380/210
See application file for complete search history.

(56) References Cited

U.S. PATENT DOCUMENTS

| 6,931,534 | B1* | 8/2005 | Jandel et al. | 713/176 |
| 2001/0033656 | A1* | 10/2001 | Gligor et al. | 380/28 |
| 2003/0231767 | A1* | 12/2003 | Carbajal | 380/200 |
| 2005/0110662 | A1* | 5/2005 | Mukherjee et al. | 341/50 |
| 2005/0262573 | A1* | 11/2005 | Bo et al. | 726/27 |
| 2009/0316901 | A1* | 12/2009 | Hayashi | 380/267 |

FOREIGN PATENT DOCUMENTS

WO    WO0031964    6/2000

OTHER PUBLICATIONS

Schneier B Ed, "Applied Cryptography, Description of DES", Second Edition, John Wiley & Sons, Inc. New York, Jan. 1, 1996, pp. 270-277, XP002237575, ISBN: 978-0-471-11709-4.*
Kunkelmann et al., "A Scalable Security Architecture for Multimedia Communication Standards", Multimedia Computing and Systems '97 Proceedings, Los Alamitos, CA, Jun. 3, 1997, p. 660-661.
Schneier, "Applied Cryptography, Descriiption of DES", Applied Cryptography, Second Edition, Jan. 1, 1996, pp. 270-277.
Fujii et al., "Partial-Scrambling of Information", Japan Telecommunication Review, vol. 11., No. 1, Japan, Jan. 1, 1999, pp. 116-123.
Search Report Dated Sep. 25, 2009.

\* cited by examiner

*Primary Examiner* — Christopher Brown
(74) *Attorney, Agent, or Firm* — Tutunjian & Bitetto, P.C.

(57) ABSTRACT

A method of encryption, using an encryption key K with key length k, of at least one message M comprising uniformly distributed symbols, k bits are encrypted of messages at least k bits long, while shorter messages are lengthened, e.g. by padding or concatenation, to obtain a lengthened message at least k bits long before encryption. The encryption efficiency is thus optimized while the encryption security is retained. The encryption method is particularly suitable for JPEG2000 encoded packets comprising a message M. Also provided are an encryption apparatus, a decryption method and a decryption apparatus.

15 Claims, 4 Drawing Sheets

METHODS AND APPARATUSES FOR SELECTIVE DATA ENCRYPTION

This application claims the benefit, under 35 U.S.C. §365 of International Application PCT/EP2009/058161, filed Jun. 30, 2009, which was published in accordance with PCT Article 21(2) on Jan. 7, 2010 in English and which claims the benefit of European patent application No. 08305364.5, filed on Jun. 30, 2008.

FIELD OF THE INVENTION

The present invention relates generally to data encryption, and in particular to encryption of image data organised in packetized bit streams.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

As an illustrative example, the following description will be directed to protection of packetized video data streams, such as those obtained by for instance JPEG2000 encoding. The skilled person will however appreciate that the data protection of the present invention may also be used in analogous fields in which data is transmitted in packets having the necessary properties.

It has long been known to protect video data by encryption, notably in conditional access television systems. FIG. 1 illustrates a traditional prior art approach for content access control. The video signal CNT is first encoded 110 using a standard compression encoder, and the resulting bit stream CNT' is then encrypted 120 using a symmetric encryption standard (such as DES, AES, or IDEA). The encrypted bit stream [CNT'] is then received by a receiver that decrypts 130 the encrypted bit stream [CNT'] to obtain an encoded bit stream CNT' that is decoded 140 to obtain a video signal CNT that is, at least in theory, identical to the initial video signal. In this approach, called fully layered, compression and encryption are completely independent processes. The media bit stream is processed as classical plaintext data, with the assumption that all symbols or bits in the plaintext are of equal importance, i.e. the symbols are uniformly distributed.

This scheme is relevant when the transmission of the content is unconstrained, but it seems inadequate in situations where resources (such as memory, power or computation capabilities) are limited. Another way of putting this is that it is sometimes desired to increase the capacity of e.g. a processor to process encrypted data.

Further, much research shows the specific characteristic of image and video content—high transmission rate and limited allowed bandwidth—which justifies the inadequacy of standard cryptographic techniques for such content. This has led to researchers to explore a new scheme of securing the content—named "selective encryption", "partial encryption", "soft encryption", or "perceptual encryption"—by applying encryption to a subset of a bit stream with the expectation that the resulting partially encrypted bit stream is useless without the decryption of the encrypted subset. The general approach is to separate the content into two parts: the first part is the basic part of the signal (for example Direct Current, DC, coefficients in Discrete Cosine Transform, DCT, decomposition, or the low frequency layer in Discrete Wavelet Transform, DWT, decomposition), which allows the reconstruction of an intelligible, but low quality version of the original signal, and a second part that could be called the "enhancement" part (for example Alternating Current, AC, coefficients in DCT decomposition of an image, or high frequency layers in DWT), which allows the recovery of fine details of the image and reconstruction of a high quality version of the original signal. According to this scheme, only the basic part is encrypted, while the enhancement part is sent unencrypted or in some cases with light-weight scrambling. The aim is to protect the content and not the binary stream itself.

FIG. 2 illustrates selective encryption according to the prior art. Encoding and decoding is performed as in FIG. 1. In selective encryption, the encoded bit stream CNT' is encrypted 220 depending on selective encryption parameters 240. These parameters may, as mentioned, for example state that only the DC coefficients or the low frequency layer should be encrypted, while the rest of the encoded bit stream CNT' should be left unencrypted. The partially encrypted bit stream [CNT'] is then (partially) decrypted 230 depending on the selective encryption parameters 240.

An exemplary selective encryption scheme is described by T. Kunkelmann and R. Reinema in "A Scalable Security Architecture for Multimedia Communication Standards"; Multimedia Computing and Systems '97. Proceedings, IEEE International Conference on Ottawa, Ont., Canada, 3-6 Jun. 1997, Los Alamitos, Calif., USA, IEEE Comput. Soc, US, 3 Jun. 1997, pages 660-661, XP010239268, ISBN: 978-0-8186-7819-6. To encrypt an 8×8-block, two integer values smaller than 64 is chosen; one value is for the DC components and one for the AC components. The individual blocks are then encrypted, for example using DES with a key length of 64 bits (e.g. described by Scheier B: "Applied Cryptography, Description of DES" Applied Cryptography, Second Edition, Protocols, Algorithms and Source Code in C, John Wiley & Sons, Inc, New York, 1 Jan. 1996, pages 270-277, XP002237575, ISBN: 978-0-471-11709-4). Other suitable block encryption methods, such as the one described in US 2001/0033656, may apparently also be used. The process is iterated until a number of AC and/or DC components have been encrypted. In other words, not all the components are encrypted, but each component is fully encrypted.

As the invention is particularly suitable for JPEG2000, which will also be used as a non-limitative embodiment of the invention, a brief introduction to relevant parts of this standard, i.e. its code stream structure, will now be given.

The JPEG2000 code stream is organized into packets, code stream packets are elementary units that transport data from a specific combination of entities called Resolution, Layer, Component and Precinct. A compressed image with R resolutions, L layers, P precincts and C components, thus results in RxLxCxP packets.

JPEG2000 makes use of an embedded bit stream: the code stream can be truncated at any given end of packet without adverse impact on previously coded ones.

FIG. 3 illustrates the main code stream structure, comprising:

A main header 310, comprising a Start of Code stream (SOC=0xFF4F) marker segment 312 and the main header marker segments 314. The SOC marker indicates the start of the code stream and is required as the first marker. The main header marker segments indicate many user defined compression parameters, such as for example progression order, main coding style, components coding style, and tile size.

One or more Tile-part headers 320a, 320b, each comprising a Start of Tile-part marker (SOT=0xFF90) 322, tile part information 324a, 324b, and a Start of Data marker (SOD=0xFF93) 326. As will be appreciated, the SOT 322 and the SOD 326 have standard values, while the tile part information 324a, 324b comprises information about the tile; e.g. tile part information 324a indicates that it belongs to Tile 0, while tile part information 324b indicates that it belongs to Tile 1. At least one tile-part header 320a, 320b is required at the beginning of each tile-part, which comprises the tile-part header 320a, 320b and, usually, a following bit stream 330a, 330b, where the SOD marker indicates the start of the bit stream 330a, 330b that contains the compressed data.

End of Code stream 340: this marker (EOC=0xFFD9) indicates the end of the code stream.

As can be seen, the bit stream is mainly composed of packet headers and packet data that form packets. FIG. 4 illustrates an exemplary JPEG2000 packet comprising a packet header 420 and packet data 440. Packet headers may be used in the bit stream or in the main header depending on the user defined options. FIG. 4 shows the use of such headers within the bit stream: a Start of Packet header 410 (SOP=0xFF91) and an End of Packet Header 430 (EPH=0xFF92) respectively indicate the start and the end of the packet header 420.

It should be noted that for packet data, some code words—the ones in the range [0xFF90; 0xFFFF] are reserved in JPEG2000. Such reserved code words are used as markers that delimit the main building blocks of the stream. For example, the SOT (0xFF90), the SOD (0xFF93) and the EOC (OxFFD9) are such reserved code words. When encrypting the code stream, it is important to ensure that 'normal' (i.e. non-reserved) code words do not result in encrypted code words whose value are reserved. Packet data are entropy encoded and this property makes them very suited for cryptographically secure selective encryption as will be described later.

The packet header 420 comprises information needed by the decoder to correctly parse and decode the packet data:
- Zero length packet: indicates whether or not the current packet is empty.
- Code-block inclusion: for each precinct, a tag tree is used to encode inclusion information for code blocks included.
- Zero-bitplane information: for each precinct, a tag tree encodes the first non zero bit-plane.
- Number of coding passes: Huffman-style code words are used to encode the number of coding passes included for each code block.
- Length of compressed data from each code block.

In "Techniques for a Selective Encryption of Uncompressed and Compressed Images", Proceedings of Advanced Concepts for Intelligent Vision Systems (ACIVS) 2002, Ghent, Belgium, Sep. 9-11, 2002, M. Van Droogenbroeck and R. Benedett propose to apply selective encryption to a Huffman coder. Indeed, JPEG Huffman coder terminates runs of zeros with code words/symbols in order to approach the entropy. Appended bits are added to these code words to fully specify the magnitudes and signs of non-zero coefficients, only these appended bits are encrypted using DES or IDEA.

In "Selective Encryption of Wavelet-Packet Encoded Image Data", ACM Multimedia Systems Journal, Special Issue on Multimedia Security in 2003, A. Pommer and A. Uhl propose an algorithm based on AES encryption of the header information of wavelet packet encoding of an image, the header specifying the sub-band tree structure.

In "Compliant Encryption of JPEG2000 Codestreams", IEEE International Conference on Image Processing (ICIP 2004), Singapore, October 2004, Y. Wu and R. H. Deng propose a JPEG2000 compliant encryption algorithm which iteratively encrypts Codeblock Contribution to Packets (CCPs). The encryption process acts on CCPs (in the packet data) using stream ciphers or block ciphers, preferably stream ciphers with arithmetic module addition. The key stream is generated using Rivest Cipher 4 (RC4). Each CCP is iteratively encrypted until it has no forbidden code words (i.e. any code word in the range [0xFF90, 0xFFFF]).

In "Selective Encryption of the JPEG2000 Bitstream", in A. Lioy and D. Mazzocchi, editors, Communications and Multimedia Security. Proceedings of the IFIP TC6/TC11 Sixth Joint Working Conference on Communications and Multimedia Security, CMS '03, volume 2828 of Lecture Notes on Computer Science, pages 194-204, Turin, Italy, October 2003. Springer-Verlag, R. Norcen and A. Uhl observe that JPEG2000 is an embedded bit stream and that, in progression order JPEG2000 compressed images, the most important data is sent at the beginning of the bit stream. Based on this, the proposed scheme consists in AES encryption of selected packet data. The algorithm uses two optional markers SOP and EPH (as illustrated in FIG. 4) to identify packet data. Then, this packet data is encrypted using AES in CFB mode, as the packet data has variable length. The experiments were conducted on two kinds of images (lossy and lossless compressed), with different progression orders (resolution and layer progression orders). The evaluation criterion was the visual degradation obtained for a given amount of encrypted data. It was found that for the lossy compressed images, layer progression gives better results. For lossless compressed images, resolution progression gives better results.

European patent application EP 08300093.5, provides an improved solution that uses a distortion-to-rate ratio for each packet to order the packets in descending ratio and encrypt packets until a predetermined accumulated distortion is achieved.

The Applicant has discovered, however, that the there is still room for improvement when encrypting packet data.

It can therefore be appreciated that there is a need for a solution that allows further improvement to encryption without unacceptably diminishing the security of the encrypted content. This invention provides such a solution.

SUMMARY OF THE INVENTION

In a first aspect, the invention is directed to a method of encryption, using an encryption key K with key length k, of at least one message M of uniformly distributed symbols. k bits are encrypted of each of the at least one message M with a length of k bits; and at least k bits and less than the whole length of message M are encrypted of each of the at least one message M longer than k bits.

In a first preferred embodiment, at least one message M shorter than k bits is lengthened in order to obtain a lengthened message at least k bits long. k bits of the lengthened message are encrypted, if the lengthened message is k bits long; and at least k bits and less than the whole length of the lengthened message are encrypted, if the lengthened message is longer than k bits. It is advantageous that the at least one message M is lengthened by padding or by concatenation with at least one further message.

In a second preferred embodiment, exactly k bits of the messages longer than k bits are encrypted. It is advantageous that the uniformly distributed symbols further are causal.

In a third preferred embodiment, the at least one message M is JPEG2000 encoded.

In a second aspect, the invention is directed to an apparatus for encryption, using an encryption key K with key length k, of at least one message M of uniformly distributed symbols. The apparatus comprises a processor adapted to encrypt k bits of each of the at least one message M with a length of k bits; and encrypt at least k bits and less than the whole length of message M of each of the at least one message M longer than k bits.

In a third aspect, the invention is directed to a method of decryption, using a decryption key K with key length k, of at least one encrypted message [M]. A decryption device decrypts k bits of each of the at least one encrypted message [M] with a length of k bits; and decrypts at least k bits and less than the whole length of message M of each of the at least one message M longer than k bits.

In a fourth aspect, the invention is directed to an apparatus for decryption of at least one encrypted message [M] using an encryption key K with key length k. The apparatus comprises a processor adapted to decrypt k bits of each of the at least one message M with a length of k bits; and decrypt at least k bits and less than the whole length of message M of each of the at least one message M longer than k bits.

BRIEF DESCRIPTION OF THE DRAWINGS

Preferred features of the present invention will now be described, by way of non-limiting example, with reference to the accompanying drawings, in which.

PREFERRED EMBODIMENT OF THE INVENTION

The invention uses an intrinsic property of JPEG2000 coding as a starting point to arrive at its surprising destination. In JPEG2000, Codeblock contribution to packet (CCP) is causal. Indeed, a codeblock is encoded by the CABAC (Context-Adaptive Binary Arithmetic Coding) coder which is context based. In other words, it is impossible to correctly decode a CCP without access to the beginning of the data, which makes it possible to encrypt less than the entire packet in order to guarantee cryptographic security.

Figure 1:
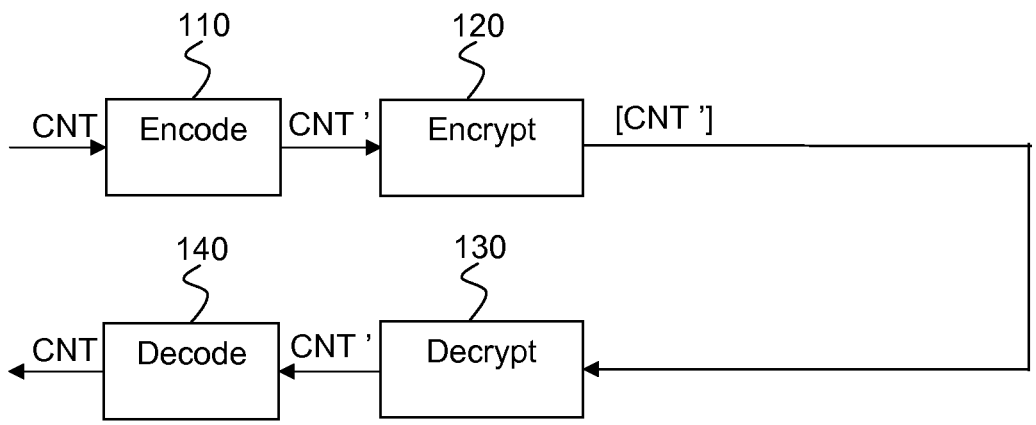
FIG. 1 illustrates a traditional prior art approach for content access control.
Figure 2:
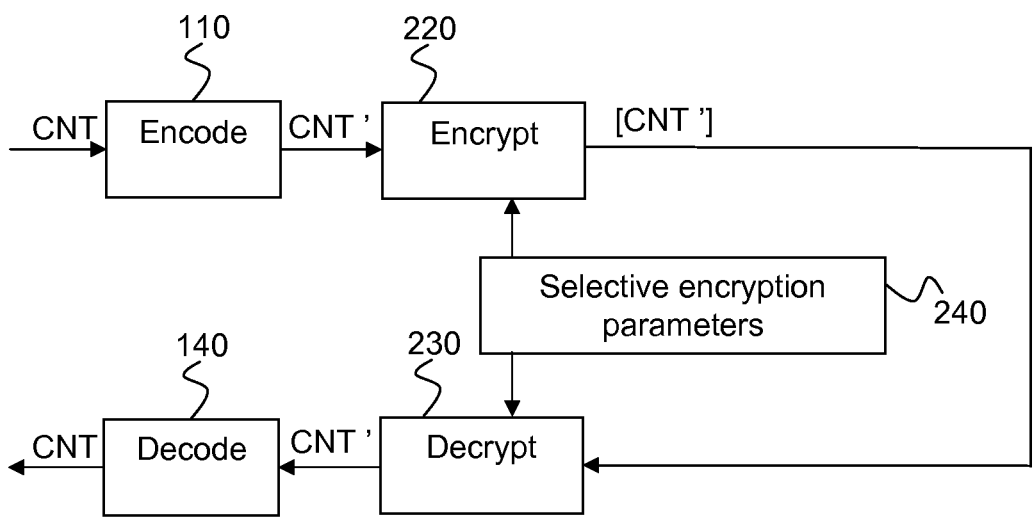
FIG. 2 illustrates selective encryption according to the prior art.
Figure 4:
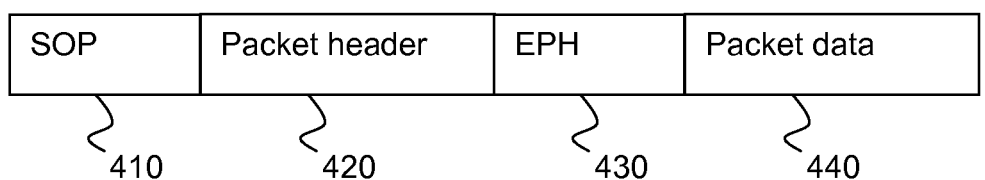
FIG. 4 illustrates an exemplary prior art JPEG2000 packet.
Figure 3:
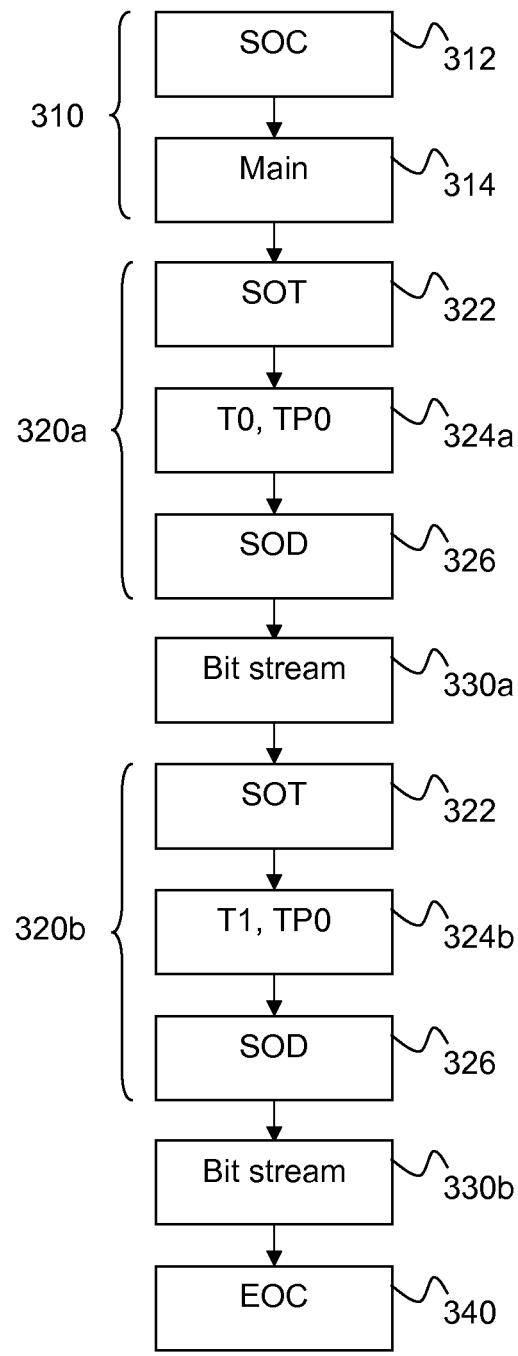
FIG. 3 illustrates the prior art JPEG2000 main code stream structure.
Figure 5:
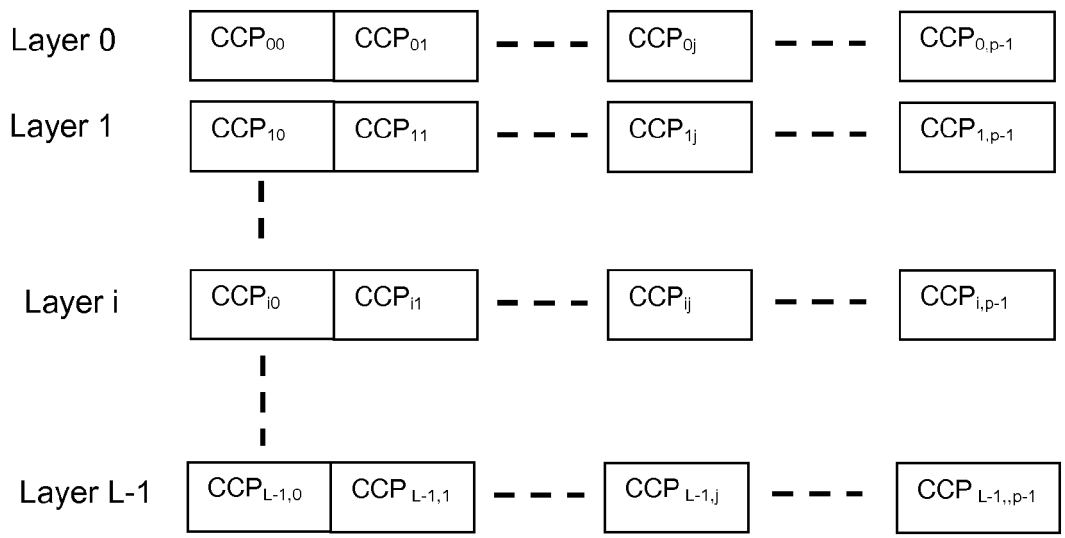
FIG. 5 illustrates JPEG2000 packets emanating from the coding of an image according to the prior art.

FIG. 5 illustrates a number of JPEG2000 encoded packets corresponding to an encoded image according to the prior art. The packets are arranged so that packets corresponding to a certain quality Layer (L) are in the same row.

Figure 6:
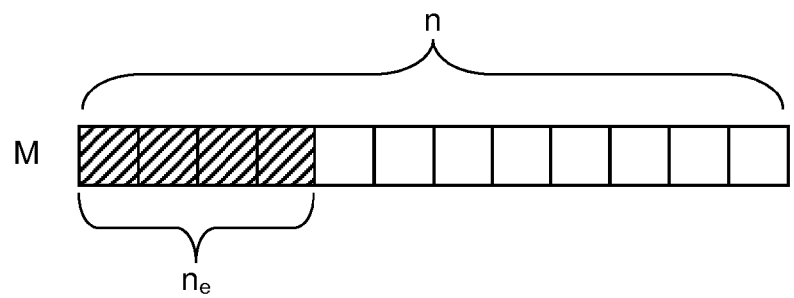
FIG. 6 illustrates schematically a message M encrypted using an embodiment idea of the invention.

FIG. 6 illustrates a message M with n bytes of which $n_e$ bytes are to be encrypted. M is made up of uniformly distributed symbols that, for example in the case of JPEG2000, may be causal. It should be noted that the message M may be regarded as payload, i.e. it does not comprise any headers, but the entire message M is for use to the receiver. To determine the amount of data to encrypt from message M, i.e. $n_e$, let us consider the message M (representing a CCP), which is encrypted with an encryption ratio ER:

$$ER = \frac{n_e}{n} = \frac{n_e}{|M|}$$

where |M| is the number of bits of M.

In order to find the minimum encryption ratio that guarantees cryptographic security, use is made of a metric to measure the unpredictability of the encrypted message.

The main idea is to consider an optimal brute force attack where the attacker has complete knowledge of the probability distribution of the language symbols. Let X be a discrete random variable that takes its values in the language $$L^{n_e}, X \in \{X_1, X_2 \ldots X_{|L^{n_e}|}\}.$$

The attacker would try to guess the value of X by trying all possible values in the decreasing order of their probabilities:

$$p_1 \geq p_2 \ldots \geq p_{|L^{n_e}|}$$

This gives a guesswork W:

$$W(X) = \sum_{i=1}^{|L^{n_e}|} i \cdot p_i$$

where W(X) is the expected number of guesses an attacker has to try before finding the right message X.

Note that since codeblock contributions are coded using arithmetic coding which outputs uniformly distributed data:

$$p_i = 1/|L^{n_e}| = 1/|\Sigma|^{n_e}$$

where $\Sigma$ is the alphabet for codeblock contributions. This gives a guesswork value of:

$$W(X) = \frac{1}{|\Sigma|^{n_e}} \sum_{i=1}^{|\Sigma|^{n_e}} i = \frac{|\Sigma|^{n_e} + 1}{2}$$

On the other hand, if the attacker uses key guessing, the expected number of key W(K) that must be guessed (or tried) to find the correct key is given, for a k-bit key, is given by:

$$W(K) = \sum_{i=1}^{2^k} \frac{i}{2^k} = \frac{2^k + 1}{2}$$

From the two latter equations, we can conclude that brute force attack on the message space is harder than key guessing if $W(X) \geq W(K)$, which may also be expressed as:

$$|\Sigma|^{n_e} \geq 2^k$$

Hence, the size of the encrypted part has a lower bound determined by:

$$n_e \geq \frac{k}{\log_2(|\Sigma|)}$$

In an exemplary embodiment of a JPEG2000 selective encryption algorithm typical values comprise:
With well studied encryption algorithm AES-128, k=128
$|\Sigma|$=256
This gives:

$$n_e \geq 16$$

To summarize, given these parameters, it is recommended that the encrypted part is at least as long as the encryption key (128 bits=16 bytes); otherwise, the encryption algorithm can be bypassed and brute force attack on the plaintext space becomes easier for the attacker. Thus, the encryption efficiency is increased while keeping encryption security if the number of encrypted bits lies between k and $|M|-1$.

In the general JPEG2000 case, let us consider a packet data belonging to $Pack_e$ and containing contributions from p code blocks $\{m_1, m_2, \ldots, m_p\}$, according to the invention, to ensure cryptographic security, at least $$\frac{k}{\log_2(|\Sigma|)}$$

bytes from each codeblock contribution should be encrypted. The skilled person will appreciate that this result can be generalised to data resulting from other suitable encoding methods.

However, in order to optimize the encryption, it is preferred that exactly this number of bytes be encrypted. For this purpose, during the encoding process, metadata is generated for each packet in $Pack_e$ that gives the length of each codeblock contribution. If a codeblock contribution is smaller than $$\frac{k}{\log_2(|\Sigma|)},$$

the entire codeblock contribution is encrypted. This approach can allow achieving the lowest encryption ratio for the target application requirements that guarantees cryptographic security.

In the exemplary JPEG2000 embodiment, it is, as mentioned sufficient to encrypt 128 bits (as AES-128 is used).

The minimum encryption ratio is achieved if only the most significant layer in $L_e$ is selected for encryption. The same visual distortion is then achieved, for cryptographically secure encryption.

Figure 7:
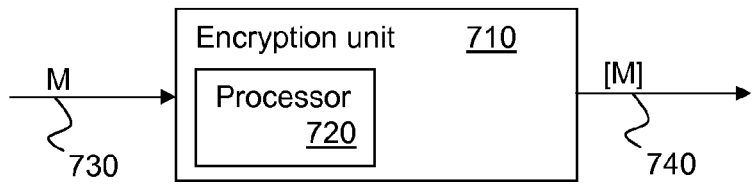
FIG. 7 illustrates an encryption device for selective encryption according to a preferred embodiment of the invention.

FIG. 7 illustrates an encryption device for selective encryption according to a preferred embodiment of the invention. The encryption device 710 comprises at least one processor (hereinafter "processor") 720, an input 730 for receiving at least one message M to encrypt and an output 740 for outputting encrypted messages [M].

Figure 8:
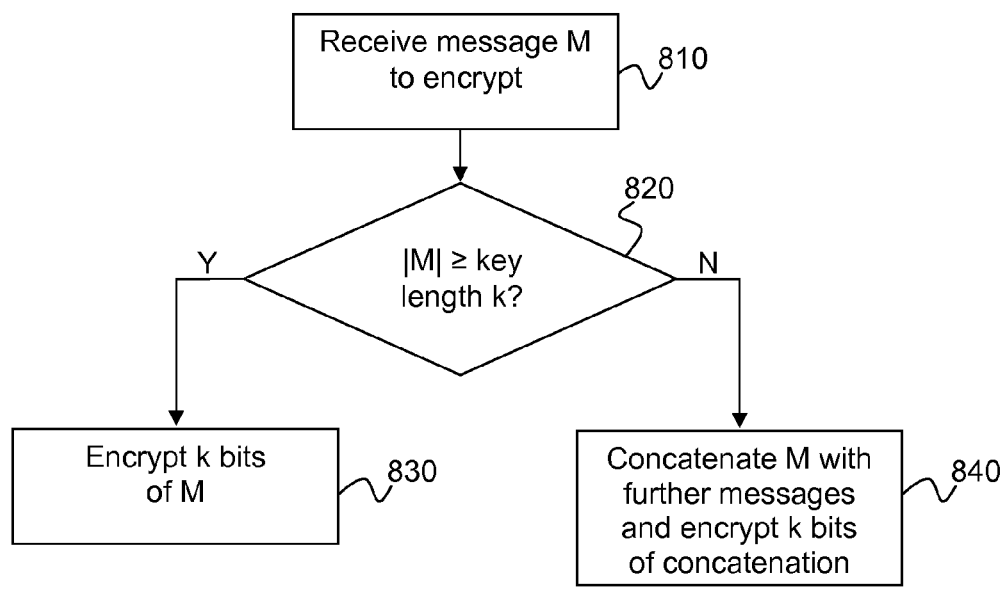
FIG. 8 illustrates a method for selective encryption according to a preferred embodiment of the invention.

With further reference to FIG. 8, the processor 720 is adapted to receive a message M to encrypt, step 810. In step 820, the processor determines if the message length $|M|$ is longer than or equal to the length k of encryption key K. If this is the case, then the processor 720 encrypts k bits, preferably the first k bits, of message M using the encryption key K in step 830. On the other hand, if the message length $|M|$ is shorter than the encryption key length k, then the processor 720 concatenates 840 message M with further messages to obtain a message that is at least k bits long and then encrypts k bits of the concatenated message using the encryption key K. It should be noted that the concatenation advantageously is for encryption purposes only, which is to say that the encrypted concatenated message is then separated into its respective encrypted messages. It should be noted that it is also possible to pad a message M that is too short so that padded message M comprises k bits. In this case, it may be necessary to add information about the padding in order for the receiver to be able to remove the padding.

In JPEG2000, it is advantageous to concatenate the message M, whenever necessary, with the message having the same Resolution (R), Component (C) and Precinct (P) from the nearest underlying quality layer (L). In other words, the message corresponding to $R_iC_iP_iL_i$ is concatenated with the message corresponding to $R_iC_iP_iL_{i+1}$ (with $L_0$ being the most significant layer) and so on until the length of the concatenation has the required length.

It will be appreciated that in most cases, message M is the payload part of a packet. It is naturally also possible that the message M is part of the payload of a packet. In these cases, the header part is not encrypted.

Figure 9:
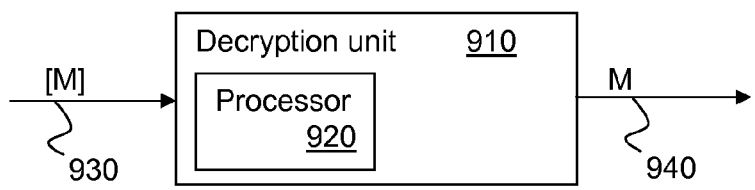
FIG. 9 illustrates a decryption device according to a preferred embodiment of the invention.

FIG. 9 illustrates a decryption device according to a preferred embodiment of the invention. The decryption device 910 comprises at least one processor (hereinafter "processor") 920, an input 930 for receiving at least one message [M] to decrypt and an output 940 for outputting decrypted messages M.

Although not illustrated in a Figure, the decryption method mirrors the encryption method illustrated in FIG. 8. The processor 920 is adapted to receive a message [M] to decrypt. The processor 920 determines if the message length $|M|$ is longer than or equal to the length k of decryption key K. If this is the case, then the processor 920 decrypts k bits—the ones encrypted by an encryption device—of message [M] using the decryption key K. On the other hand, if the message length $|M|$ is shorter than the encryption key length k, then the processor 920 concatenates encrypted messages [M] in order to obtain a concatenated message that is at least as long as the encryption key, and decrypts k bits of the concatenated message using the decryption key K. In case padding was used during the encryption, no message is shorter than k bits, so each message may be decrypted using the decryption key K and the padding may be removed (possibly using information provided by the transmitter) if necessary.

It is advantageous that the message M be at least part of the payload of a packet, as this makes it much easier for the decryption device to separate any concatenated messages.

As will be appreciated, in the preferred embodiment, the key K is a symmetric key, i.e. the encryption key and the decryption key are identical. However, it is also possible to use asymmetrical encryption schemes, for example based upon elliptic curves. In this case, it is the length of the decryption key that determines the number of bits of a message to encrypt.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated connections.

It will be appreciated that the present invention is not limited to the preferred embodiment, JPEG2000, but may equally be used in other systems having a similar, layered architecture of the compressed pictures.

Reference numerals appearing in the claims are by way of illustration only and shall have no limiting effect on the scope of the claims.

The invention claimed is:

1. A method of encryption of a message M of uniformly distributed symbols using an encryption key K with key length k, the method being performed using a processor in an encryption device and comprising the steps of:
   determining if the message M is longer than, as long as, or shorter than the key length k; and
   encrypting the message M;
   wherein k bits are encrypted for the message M with a length of k bits;
   wherein exactly k bits are encrypted for the message M with a length longer than k bits; and
   for a message M with a length shorter than the key length k:
      concatenating the message M with at least one further message in order to obtain a lengthened message at least k bits long; and
      encrypting exactly k bits of the lengthened message.

2. The method of claim 1, wherein the uniformly distributed symbols further are causal.

3. The method of claim 1, wherein the at least one message M is JPEG2000 encoded.

4. An apparatus for encryption of at least one message M of uniformly distributed symbols using an encryption key K with key length k, the apparatus comprising a processor configured to:
   determine if the message M is longer than, as long as, or shorter than the key length k; and
   encrypt the message M;
   wherein the processor is configured to encrypt k bits of each message M with a length of k bits, encrypt exactly k bits of the message M having a length longer than k bits, and for a message M having a length shorter than the key length k:
      concatenate the message M with at least one further message in order to obtain a lengthened message at least k bits long; and
      encrypt exactly k bits of the lengthened message.

5. A method of decryption of an encrypted message using a decryption key with key length k, the method being performed using a processor in an decryption device and comprising the steps of:
   determining if the encrypted message is longer than, as long as, or short than the key length k;
   decrypting each of the at least one encrypted message;
   wherein k bits are decrypted for the encrypted message with a length of k bits;
   wherein exactly k bits of the encrypted message are decrypted for the encrypted message having a length longer than k bits; and
   for the encrypted message having a length shorter than k bits:
      concatenating the encrypted message with at least one further encrypted message in order to obtain a lengthened message at least k bits long; and
      decrypting exactly k bits of the lengthened message.

6. An apparatus for decryption of at least one encrypted message using a decryption key with key length k, the apparatus comprising a processor configured to:
   determine if the encrypted message is longer than, as long as, or shorter than the key length k; and
   decrypt the encrypted message;
   wherein the processor is configured to decrypt k bits of the encrypted message having a length of k bits;
   wherein the processor is configured to decrypt exactly k bits of the encrypted message having a length longer than k bits; and
   for the encrypted message having a length shorter than k bits:
      concatenate the encrypted message with at least one further encrypted message in order to obtain a lengthened message at least k bits long; and
      decrypt exactly k bits of the lengthened message.

7. The method of claim 5, wherein the encrypted message is at least part of a payload of a packet.

8. The method of claim 5, wherein the encrypted message comprises encrypted data of a bit stream.

9. The method of claim 8, wherein the at least one further encrypted message comprises encrypted data of the bit stream and is payload of a further packet.

10. The apparatus of claim 6, wherein the encrypted message is at least part of a payload packet.

11. The apparatus of claim 6, wherein the encrypted message comprises encrypted data of a bit stream.

12. The apparatus of claim 11, wherein the at least one further encrypted message comprises encrypted data of the bit stream and is payload of a further packet.

13. The apparatus of claim 6, wherein the message comprises entropy encoded data.

14. the apparatus of claim 13, wherein the entropy encoded data has been coded by a context-based encoder.

15. The apparatus of claim 6, wherein the encrypted message is an encryption of at least one JPEG encoded codeblock.

* * * * *